Sept. 30, 1952    G. T. JACOBI    2,612,550
VOLTAGE LEVEL SELECTOR CIRCUIT
Filed Sept. 27, 1950
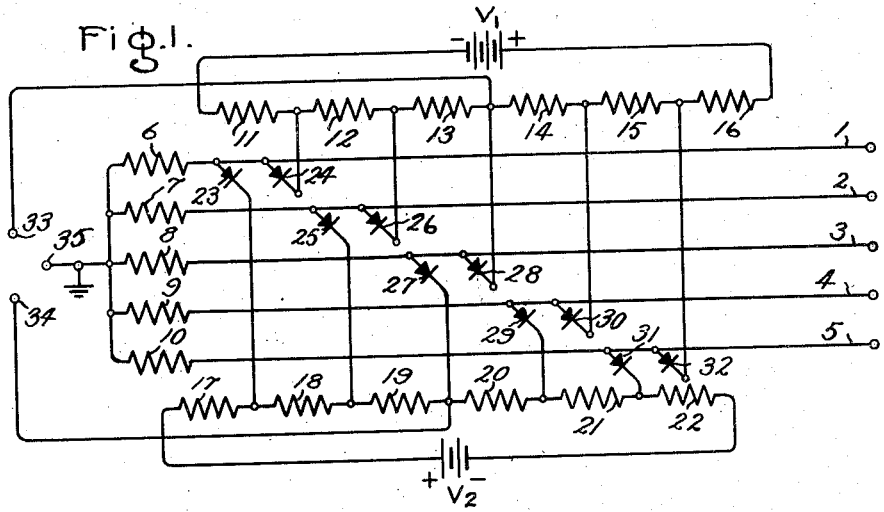
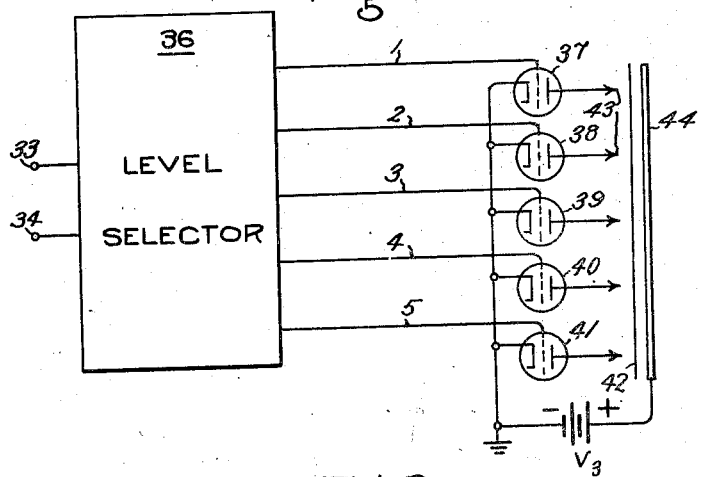
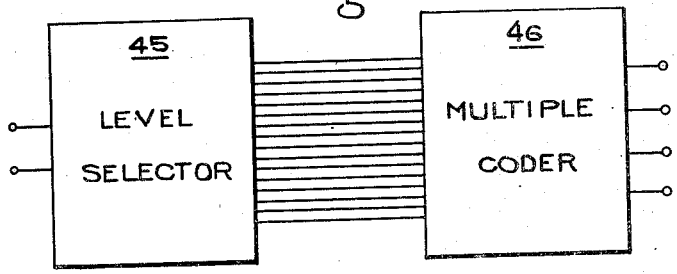
Inventor:
George T. Jacobi,
by Paul A. Frank
His Attorney.

Patented Sept. 30, 1952

2,612,550

UNITED STATES PATENT OFFICE 2,612,550

VOLTAGE LEVEL SELECTOR CIRCUIT

George T. Jacobi, Schenectady, N. Y., assignor to General Electric Company, a corporation of New York Application September 27, 1950, Serial No. 187,109

1 Claim. (Cl. 177—353)

My invention relates to voltage level selector circuits and, more particularly, to high speed switching circuits suitable for use in quantizers and also in oscillograph type recorders.

The methods known in the art for using a binary counter to translate the instantaneous amplitude of a time-varying function into a binary number utilize rather complex electronic circuits and by their very nature require a large number of electron discharge devices and are unreliable.

Because quantizers, particularly of the binary type, are being used more and more as familiarity with them increases, it appears desirable that a more simple means for quantizing a time-varying function be devised.

Accordingly, an object of my invention is to provide a new and improved electric circuit for translating a time-varying function into a number representing the instantaneous amplitude of the function.

Another object of my invention is to provide a new and improved electric circuit for selecting from among a plurality of terminals a single terminal which represents the instantaneous amplitude of a time-varying function.

A further object of my invention is to provide a voltage level selector circuit which is applicable for employment in a direct writing oscillograph.

A still further object of my invention is to provide a new and improved voltage level selector circuit utilizing a minimum of electron discharge devices.

In the attainment of the foregoing objects, I provide a multi-position selector switch employing a network having $n$ pairs of unilateral impedance devices for $n$ output voltage level lines. Each level line represents a different amplitude of an input voltage. The particular line selected at any instant of time represents the amplitude of the input voltage at the same instant. Consequently, insertion of a time-varying voltage signal results in the selection of the voltage level lines in a sequence which is in accordance with the instantaneous voltage level of the time-varying input function.

When employed in a quantizer, the voltage signal on the output level lines may be supplied to a diode coder, such, for example, as a type described in an article by Brown and Rochester, appearing in the I. R. E. publication of February 1949 entitled "Rectifier Networks for Multi-Position Switching." When employed in a direct writing oscillograph, the signal from the output level lines may be used in conjunction with a conventional recorder to mark electro-sensitive paper.

For further objects and advantages and for a better understanding of my invention, attention is now directed to the following description and accompanying drawing and also to the appended claim. In the drawing, Fig. 1 is a schematic diagram illustrating one embodiment of my invention which translates the amplitude of an input voltage signal into a voltage signal appearing on one of five terminals; Fig. 2 is a schematic diagram of my invention used in conjunction with an electro-sensitive recorder; and Fig. 3 is a quantizer utilizing an embodiment of my invention.

Referring to Fig. 1, an array of output voltage level lines 1, 2, 3, 4, and 5 are connected to ground through dropping resistors 6, 7, 8, 9, and 10, respectively. A series connection of resistors 11, 12, 13, 14, 15, and 16 comprise a voltage divider which is connected across a source of direct voltage $V_1$. Another series connection of resistors 17, 18, 19, 20, 21, and 22 comprise another voltage divider which is connected across direct voltage source $V_2$. In this embodiment, all of the resistors in the two voltage dividers have the same value and the voltage of source $V_1$ equals the voltage of source $V_2$. A unilateral impedance device 23 is connected between line 1 and the junction of resistors 17 and 18, a unilateral impedance device 24 is connected between line 1 and the junction of resistors 11 and 12, unilateral impedance device 25 is connected between line 2 and junction of resistors 18 and 19, unilateral impedance device 26 is connected between line 2 and the junction of resistors 12 and 13, unilateral impedance device 27 is connected between line 3 and junction of resistors 19 and 20, unilateral impedance device 28 is connected between line 3 and junction of resistors 13 and 14, unilateral impedance device 29 is connected between line 4 and the junction of resistors 20 and 21, unilateral impedance device 30 is connected between line 4 and the junction of resistors 14 and 15, unilateral impedance device 31 is connected between line 5 and the junction of resistors 21 and 22, and unilateral impedance device 32 is connected between line 5 and the junction of resistors 15 and 16. An input terminal 33 is connected to the junction of resistors 13 and 14, and another input terminal 34 is connected to the junction of resistors 19 and 20.

Current existing in any unilateral impedance device in the direction of low impedance drives the particular level line to which this impedance is connected below ground potential. The negative voltage appearing on the particular level line is, of course, the voltage drop across the dropping resistor in that line.

Consider, in the absence of a signal on input terminals 33 and 34, that these terminals are directly connected to terminal 35. Since devices 27 and 28 have no voltage across them, they are nonconductive and line 3 is at ground potential. Device 29, however, is conductive because of the voltage drop across resistor 20. Therefore, as heretofore explained, line 4 is below ground potential. Also, because devices 24, 26, and 31 are conductive, lines 1, 2, and 5 are below ground potential. It should be noted that line 1 is more negative than line 2 and line 5 is more negative than line 4. Thus the maximum number of level lines in any embodiment is limited by the back voltage which the unilateral impedance devices employed can withstand.

To facilitate a better understanding of this circuit, let us assume a voltage having an amplitude which is equal to the voltage drop across one of the resistors of the voltage divider to be applied to the input terminals. Let us further assume that terminal 33 is negative with respect to ground by this amplitude and that terminal 34 is positive with respect to ground by this same amplitude. Device 29 is nonconductive because the input voltage between terminals 34 and 35 is opposed to the voltage supplied from across resistor 20. Device 30 is nonconductive because the input voltage between terminals 33 and 35 is opposed to the voltage supplied from across resistor 14. Thus, line 4 is at ground potential. Devices 24, 26, 28, and 31 are conductive and thus drive lines 1, 2, 3, and 5 below ground potential. A positive voltage on terminal 33 and a negative voltage on terminal 34 equal in amplitude to the voltage drop across one of the resistors in the voltage dividers causes lines 1, 3, 4, and 5 to be driven below ground potential. This circuit may be thus used to faithfully translate a time-varying function having both positive and negative values into a sequence of voltage levels. It will be noted that the design of this circuit minimizes the response time thereof, and the sensitivity is determined by the number of level lines employed.

Referring to Fig. 2, a level selector 36, having output lines 1, 2, 3, 4, and 5, supplies a negative bias voltage to electron discharge devices 37, 38, 39, 40, and 41. These discharge devices are part of a conventional electro-sensitive recorder. Only that discharge device connected to the particular level line chosen by selector 36 is conductive. This embodiment thus constitutes a direct writing oscillograph which marks a trace of a time-varying function supplied to terminals 33 and 34 on a recording sheet 42. A plurality of marking electrodes 43 are each connected to different anodes of devices 37, 38, 39, 40 and 41 and voltage source $V_3$ maintains plate 44 positive with respect to electrodes 43.

Referring to Fig. 3, a voltage level selector 45 of the type disclosed herein and having 16 output level lines supplies a signal to a multiple coder 46. This coder transforms the signal from the level selector into a number which appears on its four output terminals. By utilizing the binary coder of Brown and Rochester described in the article hereinbefore mentioned, a binary quantizer being constructed almost entirely of diodes can be designed. Such a quantizer has the advantages of simplicity of operation, compactness of construction, and low initial cost.

While my invention has been described by a particular embodiment thereof, it will be understood that those skilled in the art may make many changes and modifications without departing from the invention. Therefore, by the appended claim, I intend to cover all such changes and modifications which fall within the true spirit and scope of my invention.

What I claim as new and desire to secure by Letters Patent of the United States is:

A voltage level selector circuit comprising $n$ electric conductors, each of said conductors being provided with an output terminal at one end thereof and a connection to ground at the other end thereof, a resistor connected in series with each of said conductors, voltage dividing means for said conductors comprising a first and second network of electric resistors in series, a first source of voltage connected across said first network and a second source of voltage connected across said second network, $n$ pairs of unilateral impedance devices with each pair being connected to a different one of said conductors, one of each pair of said devices being connected to a different point in said first network and the other of each pair being connected to a corresponding point of opposite polarity in said second network, a first source of input signal voltage connected to one of the impedance device connection points on said first network, a second source of input signal voltage connected to the corresponding point in said second network, and means to vary with time the input signals to provide different voltage levels at said output terminals of said conductors.

GEORGE T. JACOBI.

REFERENCES CITED

The following references are of record in the file of this patent:

UNITED STATES PATENTS

| Number | Name | Date |
|---|---|---|
| 1,514,753 | Wold | Nov. 11, 1924 |
| 1,593,993 | Sprague | July 27, 1926 |
| 2,032,514 | Swart | Mar. 3, 1936 |

OTHER REFERENCES

"Rectifier Networks for Multiposition Switching," Proceedings of I. R. E., February 1949, pg. 139.